Dec. 10, 1963     R. B. CLEMENTS     3,113,660
FEEDING MACHINES FOR BISCUITS OR THE LIKE LAMINAR ARTICLES
Filed Oct. 31, 1961     5 Sheets-Sheet 1
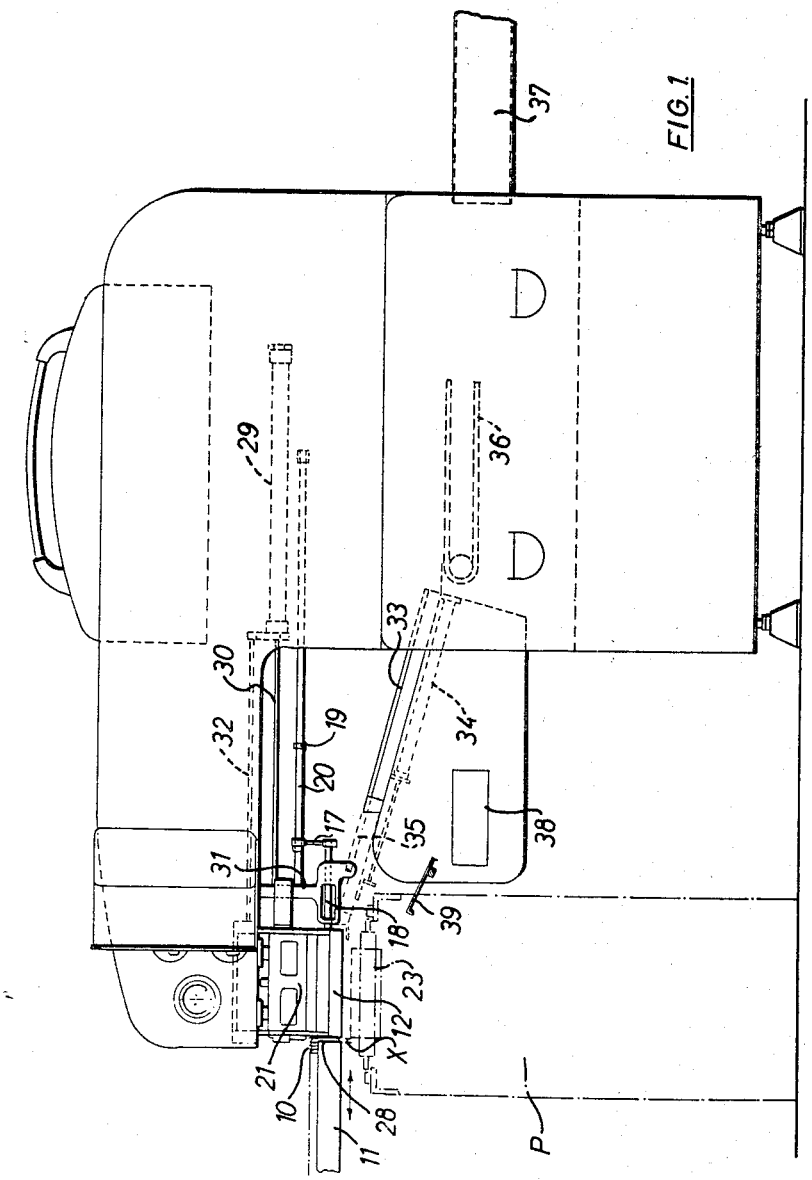
INVENTOR:
RONALD BALDWIN CLEMENTS
BY

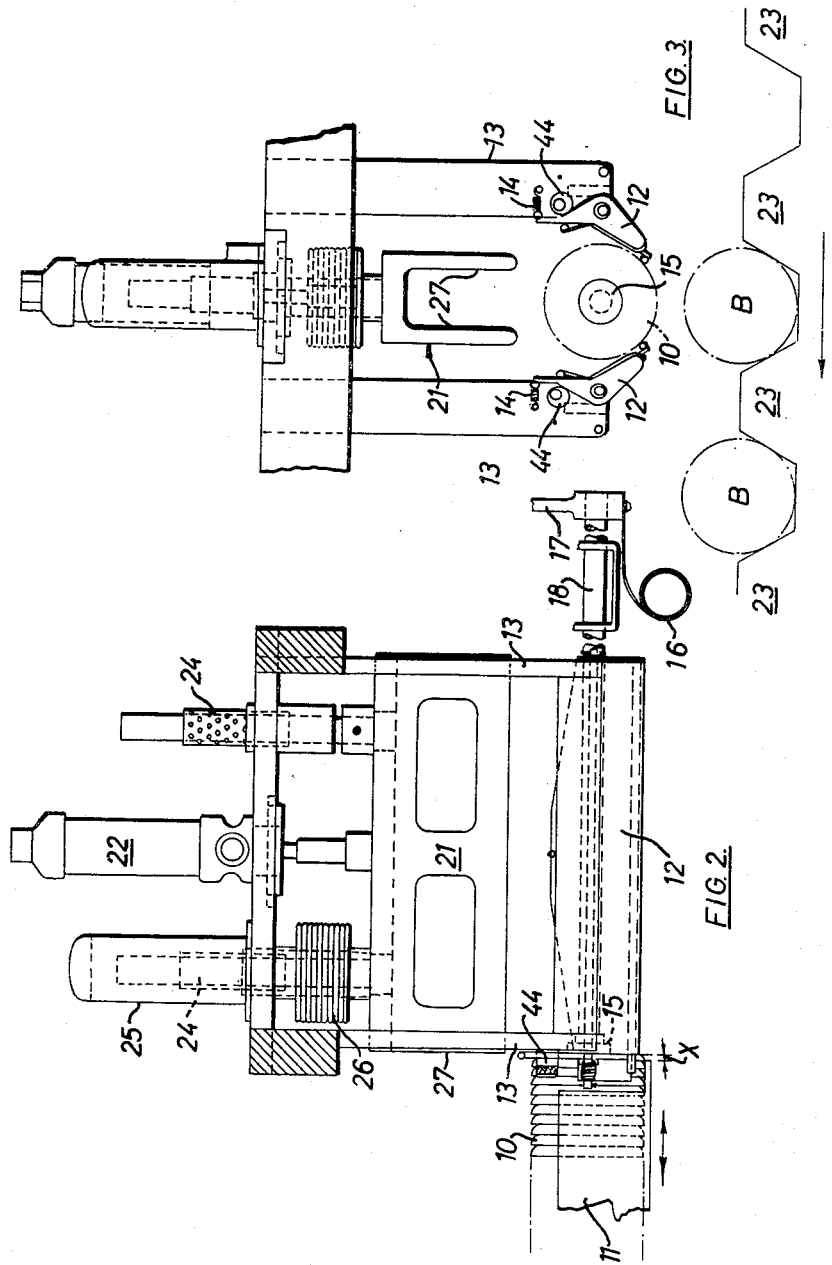

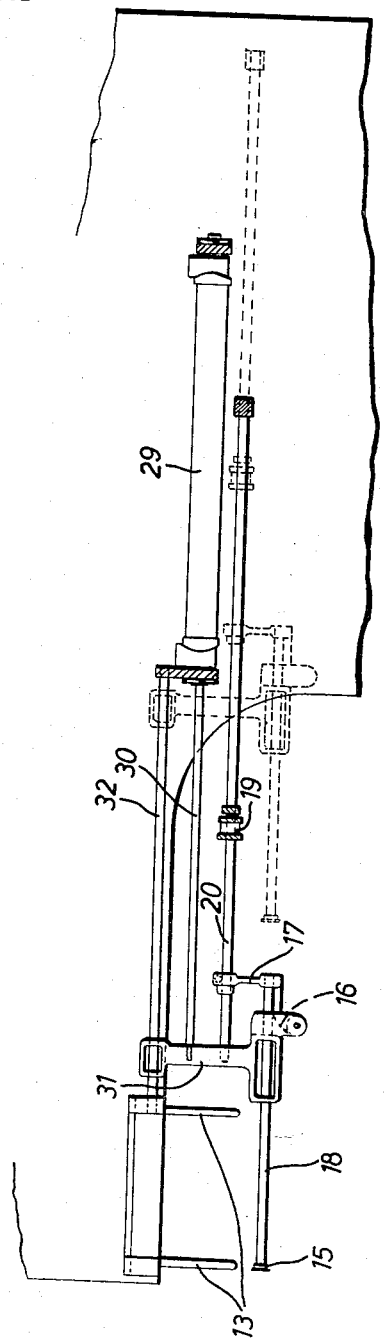

Dec. 10, 1963   R. B. CLEMENTS   3,113,660
FEEDING MACHINES FOR BISCUITS OR THE LIKE LAMINAR ARTICLES
Filed Oct. 31, 1961   5 Sheets-Sheet 5

INVENTOR:
RONALD BALDWIN CLEMENTS
BY
*Mead, Browne, Schuyler + Beveridge*
*Attorneys*

United States Patent Office 3,113,660
Patented Dec. 10, 1963

3,113,660
FEEDING MACHINES FOR BISCUITS OR THE LIKE LAMINAR ARTICLES
Ronald Baldwin Clements, Upholland, near Wigan, England, assignor to T. & T. Vicars Limited, Newton-le-Willows, England
Filed Oct. 31, 1961, Ser. No. 149,032
Claims priority, application Great Britain Nov. 8, 1960
8 Claims. (Cl. 198—31)

This invention concerns feeding machines for biscuit or the like laminar articles, and more particularly relates to such a machine for dividing a continuous stream of biscuits or the like into batches of predetermined size for delivery, for instance, to a packaging machine.

In known feeding machines for biscuits it is usual for the forward movement of a continuous stream of biscuits to be interrupted, after the passage of the desired number of biscuits to form a batch of predetermined size, by a knife edge moving into the path of the stream transversely to the direction of flow. In addition to segregating the batch the knife edge serves to hold back the stream until a further batch is to be delivered, whereupon it is withdrawn until passage of a further batch has taken place.

The disadvantage of such arrangements is that the thickness of biscuits may vary slightly in production and this variation is accumulative within a batch, with the result that various batches each containing the same number of the same type of biscuits may have a different overall length. As the passage of a batch and hence the movement of the knife edge into the stream of biscuits is determined by the movement of the stream by an amount equal to the average length of a batch, it often happens, particularly where the variation in biscuit thickness is pronounced, that the knife edge moves across the biscuit stream midway of a biscuit rather than between consecutive biscuits. This results in the biscuit being broken with consequent clogging of the machine.

The present invention seeks to obviate this disadvantage by providing a biscuit or the like laminar article feeding machine capable of segregating batches of articles from a continuous stream so as to make allowance for slight variation in article thickness i.e. always to effect segregation along a line between consecutive articles rather than to attempt segregation along a line passing through an article.

According to the present invention a biscuit or the like laminar article feeding machine comprises an inlet channel for receiving a continuous stream of biscuits or other laminar articles in stacked relationship, at least one cup containing a plunger longitudinally displaceable under the pressure of articles from said stream to allow accommodation within the cup of a batch of articles from that stream, and cut off means actuatable to segregate the batch of articles from the stream and move it out of alignment therewith whilst simultaneously constituting an abutment to arrest forward movement of the stream, the leading edge of the inlet channel and the adjacent face of the cut-off means being relatively adjustable in a longitudinal direction to define a gap approximately equal to the thickness of one of the articles.

In this way, irrespective of irregularities in article thickness, the segregation of a batch from the continuous stream will always take place along a line between articles and there will not be a tendency for an article to be broken between the cut-off means and the inlet channel as the former moves across the latter.

The cut-off means may be in the form of a reciprocable block which forces the batch of articles out of the cup against spring-loaded cheeks thereof and then retracts to leave the cup empty to receive another batch from the continuous stream in the inlet channel.

The machine may conveniently be associated with a packaging mechanism adapted ot receive the measured batches and wrap them.

The invention will now be further described by way of examples with reference to the accompanying drawings, wherein:

FIGURE 1 is a side elevation of a feeding machine according to the invention;

FIGURE 2 is a side elevation to a larger scale of the article-receiving cup, the block and associated elements;

FIGURE 3 is an end elevation corresponding to FIGURE 2;

FIGURE 4 is a detail of the article-receiving plunger and associated mechanism for withdrawing same for by-passing of articles;

Figure 5:
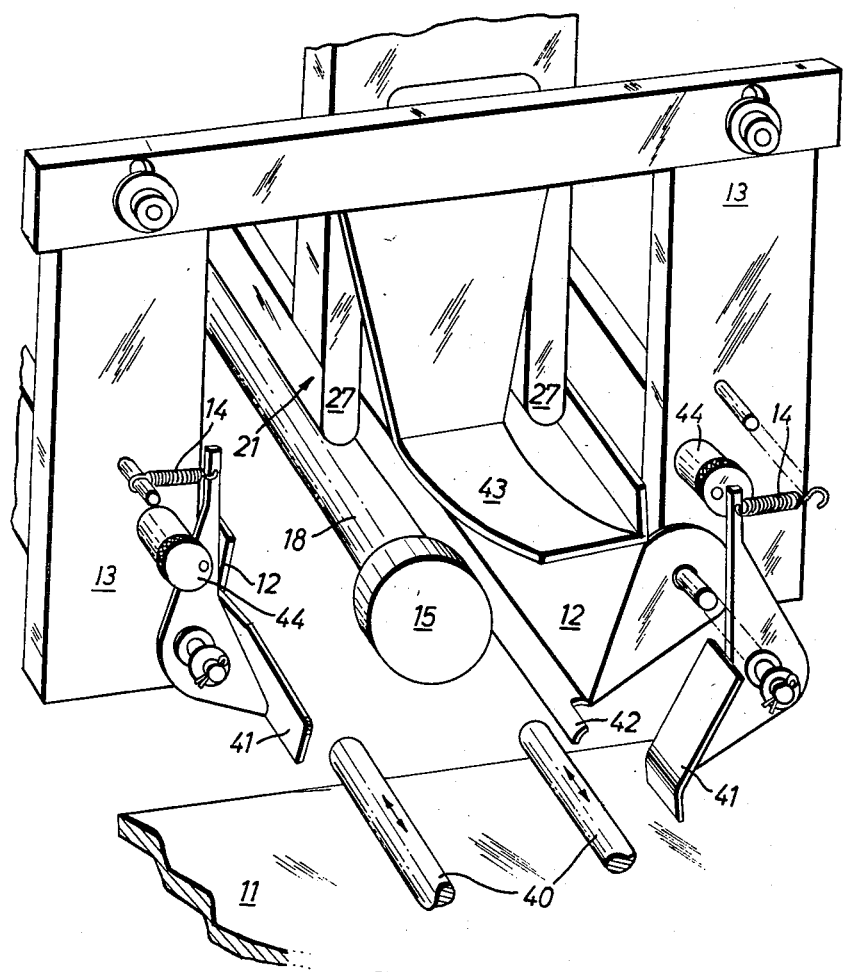
FIGURE 5 is a perspective front view of part of a modified machine with a portion of the right hand portion thereof shown in an exploded position.

The invention is shown applied to a biscuit feeding machine adapted to deliver batches of circular biscuits from a continuous stream thereof to other apparatus, such as the feeding cups of a packaging machine wherein the batches may be wrapped. It is to be appreciated however that the feeding machine is suitable for use with biscuits of shapes other than circular and in fact can be used for batching other laminar articles.

Referring to FIGURES 1, 2 and 3 a single row of biscuits 10 is delivered in stacked relationship, for instance from a baking oven, to an inlet channel 11. Horizontally aligned with inlet channel 11 and at the forward end thereof is a cup formed by opposing side cheeks 12 (FIG. 3) adapted to receive the biscuits 10. These cheeks 12 are pivotally carried in depending supports 13 and are loaded by means of tension springs 14 so as normally to be retained in the position shown in FIG. 3.

Within the cup is a longitudinally displaceable plunger 15 which is normally urged into the position shown in FIG. 2 of the drawings by a coiled spring 16 which exerts a force less than that which moves the stream of biscuits 10 along inlet channel 11. It will be seen that the advancing stream of biscuits 10 will force the plunger 15 towards the right (as viewed in FIGS. 1 and 2) as the biscuits enter the cup between cheeks 12. This action will continue until a guide 17 carried on the end of stem 18 of plunger 15 abuts against an adjustable stop 19 carried on a spindle 20 on which guide 17 slides. Thus abutment of guide 17 against stop 19 will prevent any further biscuits entering the cup and indeed the quantity of biscuits to be received within the cup at any one time can be adjusted by means of stop 19.

When the measured batch of biscuits has entered the cup a bifurcated block 21, arranged above the cup and just clear of the biscuits 10 as they are being fed into the cup, moves downwardly under the action of a pneumatically-operated cylinder 22, thereby forcing the batch of biscuits 10 within the cup downwardly. This movement causes cheeks 12 to be pivoted about their supports 13 to allow the batch of biscuits to pass therethrough whereupon the cheeks 12 are urged back into their normal position by springs 14. The batches of biscuits B forced downwardly out of the cup in this manner are received for instance in the food cups 23 of a packaging machine P and are thereafter carried away for further treatment such as wrapping. The vertical movement of block 21 is guided and controlled by linear bearings 24 preferably provided with protective covers 25 and bellows 26.

Instead of the block 21 being pneumatically operated it can, if desired, be actuated mechanically, hydraulically or electrically.

As the block 21 moves downwardly to eject the batch of biscuits from the cup the leading face 27 of the block serves to hold the oncoming supply of biscuits and prevents them from moving forward until the block 21 has been withdrawn upwardly once again to expose the empty cup. To prevent the stacked biscuits falling forward on such upward retraction of block 21, plunger 15 is urged forward into its limiting position as shown in FIGURE 1 by spring 16 as soon as the batch of biscuits has been ejected from the cup by block 21 and before the latter member is withdrawn upwardly.

This is the reason for the bifurcation of block 21 which enables the plunger 15 to move forward into contact with the leading biscuit 10 of the stream before the front face 27 of the block 21 moves upwardly out of contact therewith.

As will be seen from FIGURE 1 and more clearly from FIGURE 2 of the drawings a horizontal gap X exists between the leading edge 28 of the inlet channel 11 and the front face 27 of the block 21. The edge 28 of channel 11 is adjustable for instance by means of a vernier (not shown) so that the gap X may be at least the thickness of a biscuit. In this way it is ensured as hereafter described in greater detail with reference to FIGURES 6 to 8, that separation of a batch of biscuits from the continuous stream, always takes place along a line between consecutive biscuits.

If the biscuits are originally received in channel 11 in a slack state, they can be "tightened up" into a closely stacked relationship by upper and lower driven belts (not shown) in known manner whilst still in the channel. Alternatively the inlet channel may be inclined to assist transfer of the biscuits from the channel to the cup.

In case it is desired to interrupt delivery of segregated batches of biscuits to associated equipment, for instance in the event of a fault occurring in the packaging machine, it is desirable to provide by-pass means for the biscuits. This is accomplished by withdrawing plunger 15 completely from within block 21 which would be held in the up position, and allowing the stream of biscuits from the inlet channel to pass on to an alternative outlet.

This by-passing is best described with reference to FIGURES 1 and 4. When, for any reason, it is necessary to allow the biscuits to pass through the feeding machine in a continuous flow without being batched, plunger 15 is withdrawn to a station remote from block 21, i.e., to the position shown in dotted outline in FIGURE 4 by actuation of a pneumatic cylinder 29. The piston rod 30 of this cylinder is normally projected as shown in the drawings, and carries at its forward end a cross piece 31 which is slidably arranged on a fixed tube 32 carried by the cylinder 29. Cross piece 31 acts as a mounting for the spindle 20 of guide 17. Retraction of piston rod 30 therefore causes cross piece 31, and with it the elements 15 to 17, to be dis-associated with block 21 so that the biscuits 10 from channel 11 can pass right through the cup formed between cheeks 12. To receive such biscuits a two-part telescopic chute 33 behind and below the block 21 is extended by actuation of a pneumatic cylinder 34 to move an inner chute 35 into the vicinity of the rear end of the cup. Biscuits falling down the chute pass onto a conveyor 36 from whence they are transferred to a by-pass conveyor 37 which leads them away. A collector box 38 may be provided beneath the chute 33, together with a deflector plate 39.

Figure 6:
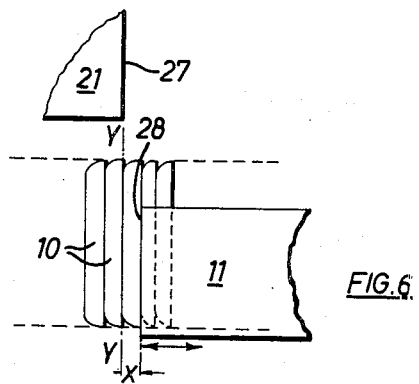
FIGURES 6, 7 and 8 each show diagrammatically the co-operating cut-off means and the article inlet channel, with articles arrested in a different position in each case.
Figure 7:
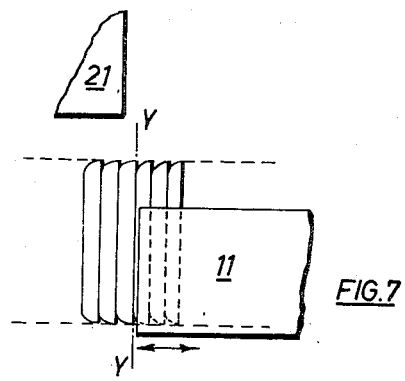
Figure 8:
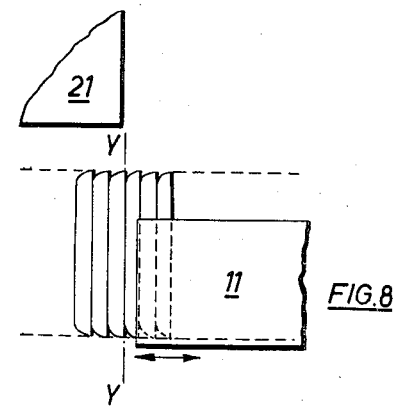

FIGURES 6, 7 and 8 show various positions in which the biscuits may come to rest with respect to the leading edge 28 of the inlet channel 11 and the cut-off means after delivery of a batch of biscuits 10 to the cup. The cut-off means is shown diagrammatically being formed by the leading face 27 of the block 21. The adjustable leading end of inlet channel 11 is shown to have a clearance of X, equal to the thickness of one biscuit, from the forward face 27 of block 21. In each case it will be seen that relative downward movement of the cut-off means, i.e., the block 21, will effect segregation of the batch of biscuits B along a line Y—Y intersecting consecutive biscuits.

As with such a machine it will sometimes occur that a biscuit or other article will completely overlie that gap x, i.e., the planes of contact of that article with the articles immediately in front of and behind it will correspond with the planes of the leading edge of the inlet channel and the adjacent face of the cut-off means, it is necessary to afford support to that article to prevent it falling or being partially displaced through said gap out of alignment with the oncoming stream when the cut-off means segregates the batch from the stream. On the other hand, it is necessary for such a support to have a degree of resiliency so that, in another instance when two articles partially overlie the gap, that one article which is nearest the cut-off means is able to move downwardly as part of the batch. To prevent the possibility of a biscuit falling down through gap X, brushes may be fitted over at least part of the adjustable gap.

However, it will generally be found that a more positive form of support is necessary, and this may be provided by separately spring-loaded extensions of the cheeks 12 which define the stationary cup, these extensions bridging the adjustable gap X. Preferably a plurality of extensions of differing widths are provided to enable extensions of the appropriate width to be fitted to the machine after adjustment of the gap X to the approximate thickness of the biscuits or other articles being handled. Such an arrangement is shown in FIGURE 5 wherein elements identical or similar to those of the other figures have been allocated the same references. Some of the elements on the right hand side of FIGURE 5 are shown in an exploded position to assist understanding of the construction. Biscuits are fed in stacked relationship along an inlet channel 11 the forward end of which is formed by spaced support rods 40 the position of which is adjustable in the direction of their length, thereby to vary the gap between the inlet channel and the cut-off means of the segregating device, i.e. the face 27 of block 21.

Aligned with inlet channel 11 is a receiving cup defined by pivotally displaceable spring-loaded cheeks 12, and within the cup is a longitudinally displaceable plunger 15. Above the cup is the downwardly displaceable bifurcated block 21.

To afford support to an article which may just bridge the aforementioned gap when a batch of articles has been accommodated within the cup, the cheeks 12 are provided with spring-loaded extensions 41. These extensions overlie a projection 42 of each cheek 12 so that the latter can be forced outwardly, by a batch of biscuits being pushed down by block 18, without the extensions 41 being moved, but the extensions cannot pivot about their mounting points without the cheeks executing a similar movement. This means that if a biscuit or other article within the batch to be segregated partially overlies the gap and hence is contacted by the block 21 as it moves down, the extensions 41 will pivot outwardly and allow that article to be discharged from the cup with the batch. In that case the next consecutive article in the stream will still be partially supported by the rods 40 or other elements of the inlet channel 11 and will only partially overlie the adjustable gap. Hence it will be retained in position to form the first article of the next batch to enter the cup when the block 21 retracts upwardly. If, on the other hand, an article completely overlies the adjustable gap when a batch has entered the cup, then the front edge of the block 21 will not contact it as the batch is forced out of the cup and cheeks 12 will separate to allow discharge of the batch while extensions 41 will remain in position under the action of their springs to support the article in line with the stream in channel 11.

To prevent the leading article in inlet channel 11 from being carried upwardly out of line with the stream by block 21 when the latter is being retracted upwardly after having discharged a batch from the cup, a retaining finger 43 is conveniently provided to extend over the forward end of inlet channel 11 and over the adjustable gap.

To enable the clearance between cheeks 12 and/or extensions 41 to be adjusted to accommodate biscuits of different sizes, cams 44 may be provided on supports 13 (see FIGURE 5).

I claim:

1. In a laminar article feeding machine, an inlet channel for receiving a continuous stream of laminar articles in stacked relationship, at least one cup aligned with said inlet channel, a plunger within said cup and longitudinally displaceable therein under the pressure of articles from said stream to allow accommodation within the cup of a batch of articles from that stream, a reciprocable block actuatable to segregate the batch of articles from the stream, to move it out of alignment therewith, and to force it out of said cup whilst simultaneously constituting an abutment to arrest forward movement of the stream, whereafter it is retracted to leave said cup empty to receive another batch of articles from the continuous stream, a leading edge of said inlet channel and the adjacent face of said reciprocable block being relatively adjustable in a longitudinal direction to define a gap approximately equal to the thickness of one of the articles and means located within said gap to prevent an article from falling through said gap.

2. A laminar article feeding machine as set forth in claim 1 wherein said reciprocable block is bifurcated to accommodate said plunger movably therein, said plunger returning to its forward position within said cup after said block has ejected the batch of articles therefrom and before the block retracts, whereby the plunger is in contact with the leading article of the stream in said inlet channel before the adjacent face of said block is withdrawn therefrom.

3. A laminar article feeding machine comprising an inlet channel for receiving a continuous stream of laminar articles in stacked relationship, at least one cup aligned with said inlet channel, a plunger within said cup and longitudinally displaceable therein under the pressure of articles from said stream to allow accommodation within the cup of a batch of articles from that stream, and cut-off means actuatable to segregate the batch of articles from the stream and move it out of alignment therewith whilst simultaneously constituting an abutment to arrest forward movement of the stream, the extent of plunger movement with said cup being adjustable to enable the number of articles within a batch to be controlled, a leading edge of said inlet channel and the adjacent face of said cut-off means being relatively adjustable in a longitudinal direction to define a gap approximately equal to the thickness of one of the articles and means located within said gap to prevent an article from falling through said gap.

4. A laminar article feeding machine comprising an inlet channel for receiving a continuous stream of laminar articles in stacked relationship, at least one cup aligned with said inlet channel, a plunger within said cup and longitudinally displaceable therein under the pressure of articles from said stream to allow accommodation within the cup of a batch of articles from that stream, cut-off means actuatable to segregate the batch of articles from the stream and move it out of alignment therewith whilst simultaneously constituting an abutment to arrest forward movement of the stream, by-pass means whereby said plunger may be completely withdrawn from within said cup when said cut-off means are retracted to allow articles from the continuous stream to pass right through said cup, a leading edge of said inlet channel and the adjacent face of said cut-off means being relatively adjustable in a longitudinal direction to define a gap approximately equal to the thickness of one of the articles and means located within said gap to prevent an article from falling through said gap.

5. A laminar article feeding machine as set forth in claim 4 wherein said by-pass means comprise article-receiving elements which can be projected adjacent to the end of said cup remote from said inlet channel on complete withdrawal of said plunger from said cup to receive articles passing through said cup.

6. A laminar article feeding machine as set forth in claim 4 wherein said by-pass means comprise a two-part telescopic chute and a conveyor, adapted to receive and lead away articles passing through said cup.

7. A laminar article feeding machine comprising an inlet channel for receiving a continuous stream of laminar articles in stacked relationship, a pair of spring-loaded cheeks defining an article receiving cup aligned with said inlet channel, a plunger within said cup and longitudinally displaceable therein under the pressure of articles from said stream to allow accommodation within the cup of a batch of articles from that stream, cut-off means actuatable to segregate the batch of articles from the stream and move it out of alignment therewith, by forcing it out of said cup between said spring-loaded cheeks whilst simultaneously constituting an abutment to arrest forward movement of the stream, a leading edge of said inlet channel and the adjacent face of said cut-off means being relatively adjustable in a longitudinal direction to define a gap approximately equal to the thickness of one of the articles and means located within said gap to prevent an article from falling through said gap.

8. A laminar article feeding machine as defined in claim 7 comprising separately-movable, spring-loaded extensions of said cheeks defining said cup, said extensions bridging at least in part the gap defined between said inlet channel and said cut-off means.

References Cited in the file of this patent
UNITED STATES PATENTS

| | | |
|---|---|---|
| 1,142,025 | Christoe | June 8, 1915 |
| 2,513,662 | McCullough | July 4, 1950 |